(12) United States Patent
Yokoyama

(10) Patent No.: US 6,231,069 B1
(45) Date of Patent: May 15, 2001

(54) AIR BAG APPARATUS AND INFLATOR APPARATUS THEREFOR

(75) Inventor: Aki Yokoyama, Fujinomiya (JP)

(73) Assignee: Nihon Plast Co., Ltd. (JP)

( * ) Notice: Subject to any disclaimer, the term of this patent is extended or adjusted under 35 U.S.C. 154(b) by 0 days.

(21) Appl. No.: 09/193,065

(22) Filed: Nov. 16, 1998

(30) Foreign Application Priority Data

Nov. 26, 1997 (JP) .................................................. 9-324873

(51) Int. Cl.⁷ .................................................. B60R 21/22
(52) U.S. Cl. .................................. 280/730.2; 280/743.1; 280/741
(58) Field of Search ............................. 280/730.1, 730.2, 280/736, 741, 740, 742, 728.2, 728.1, 743.1

(56) References Cited

U.S. PATENT DOCUMENTS

| | | | |
|---|---|---|---|
| 5,351,989 | * | 10/1994 | Popek et al. ........................... 280/740 |
| 5,451,381 | * | 9/1995 | Kishimoto et al. ................... 280/736 |
| 5,503,428 | * | 4/1996 | Awotwi et al. ..................... 280/730.1 |
| 5,779,263 | * | 7/1998 | Lane, Jr. et al. ................... 280/730.2 |
| 5,803,485 | * | 9/1998 | Acker et al. ........................ 280/728.2 |
| 5,829,779 | * | 11/1998 | Nakashima et al. ............... 280/730.2 |
| 5,848,804 | * | 12/1998 | White, Jr. et al. ................. 280/730.2 |
| 5,913,536 | * | 6/1999 | Brown ................................ 280/730.2 |
| 5,918,898 | * | 7/1999 | Wallner et al. ..................... 280/728.2 |
| 5,951,042 | * | 9/1999 | O'Loughlin et al. ................ 280/741 |

FOREIGN PATENT DOCUMENTS

| | | | |
|---|---|---|---|
| 4009551 | * | 9/1991 | (DE) ..................................... 280/736 |
| 9-11842 | | 1/1997 | (JP) . |
| 9-123864 | | 5/1997 | (JP) . |
| 97/10461 | | 1/1997 | (WO) . |
| 97/14586 | | 4/1997 | (WO) . |

* cited by examiner

Primary Examiner—Robert P. Olszewski
Assistant Examiner—Lynda Jasmin
(74) Attorney, Agent, or Firm—Kilpatrick Stockton

(57) ABSTRACT

A wall 17 capable of receiving discharged gas G through a first port 11 is formed on a portion of a holder 12 opposed to the first port 11 of an inflator 10. The gas G reaching the bag body 14 through the first port 11 of the inflator 10 and the second port 13 of the holder 12 is discharged toward the vicinity of a bottom 16a of a chest supporting portion 16 of the bag body 14.

3 Claims, 6 Drawing Sheets

*FIG.2* *FIG.3*
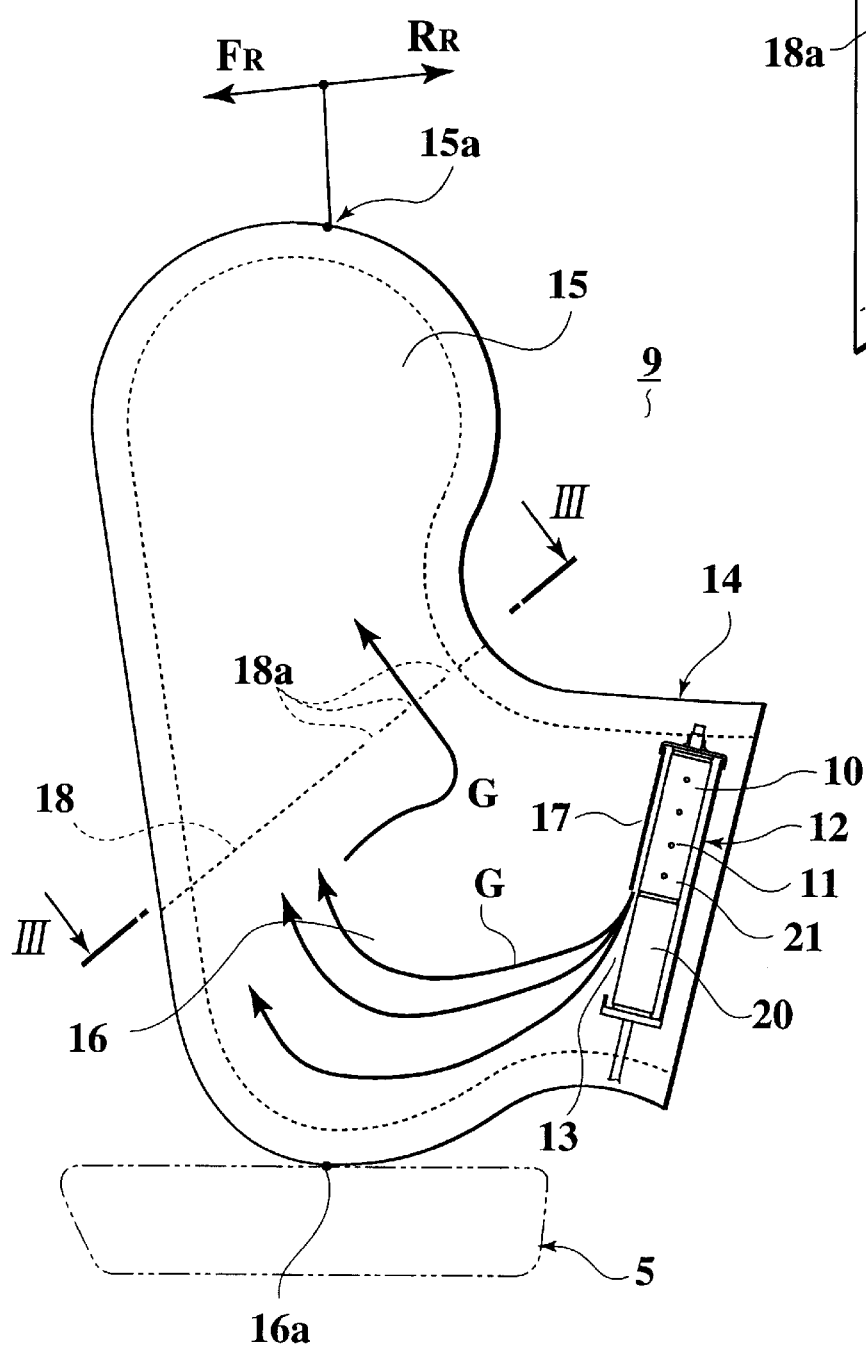
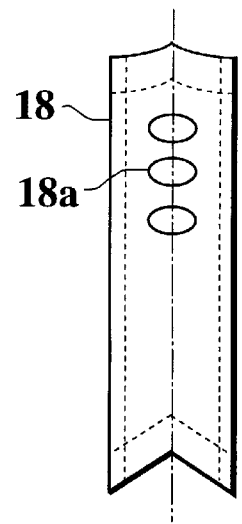

AIR BAG APPARATUS AND INFLATOR APPARATUS THEREFOR

BACKGROUND OF THE INVENTION

1. Field of the Invention

The present invention relates to an air bag apparatus which expands in an instant for protecting a passenger of an automobile at the time of collision of the automobile, especially at the time of a side-on crash in which other automobile crashes into a side of the automobile.

2. Description of the Related Art

A conventional air bag apparatus will be described hereinafter.

In a gas bag-type side collision protecting apparatus, a bag body is normally folded and accommodated in a housing in a seat back. An inflator is arranged at a position facing a gas inlet port of the bag body, and is ignited by a signal of a shock detecting sensor at the time of the side-on crash of the automobile to generate gas. Gas is introduced through the gas inlet port into the bag body to expand the bag body. The bag body expands forward from the seat back, and is developed in a space between the passenger and a side wall in the passenger's room. A shock generated when the passenger secondary collides against a side wall of the passenger's room is absorbed by the bag body (see Japanese Patent Application Laid-open No.9-123864, for example).

The bag body is divided into a portion supporting the head of the passenger and a portion supporting the chest of the passenger, or is integrally formed, so that gas discharged by the inflator is charged into the bag body in a short time.

It is experimentally confirmed that the behavior of the secondary collision of the passenger at the time of the side-on crash is such that the chest of the passenger strongly collides against the side wall in the passenger room such as to lash around waist, and subsequently, the head of the passenger strongly collides against the side wall in the passenger room.

However, with the structure of such an air bag apparatus, since gas discharged by the inflator is at a high temperature, it is necessary that the bag body into which the high temperature gas is charged can withstand such a high temperature, and which is one cause for increasing the costs, and the improvement thereof is required.

Further, if the bag body expands on at least a wearing track of the shoulder belt among the wearing track of the seat belt comprising the shoulder belt and lap belt for binding the chest and waist of the passenger sitting on the seat back, the belt is pushed, and there is an undesirable possibility that the webbing of the belt may be separated from the passenger. Further, the expansion of the bag body may be hindered by the belt, an improvement of this point is also required.

Furthermore, it is necessary to provide the bag body with means for guiding a flow of gas into the head supporting portion and the chest supporting portion of the bag body, and which is one cause for increasing the costs, and the improvement thereof is required.

SUMMARY OF THE INVENTION

It is an object of the present invention to provide an air bag apparatus in which it is unnecessary to take measures to cope with a body of high temperature gas charged into the bag body, or simple measures suffice to cope with high temperature gas.

Another object of the present invention is to provide an air bag apparatus for allowing gas to flow into the head supporting portion of the bag body smoothly and inexpensively without deteriorating the wearing track of the seat belt even if the bag body expands.

To achieve the above objectives, according to a first aspect of the present invention, there is provided an air bag apparatus comprising: an inflator which has a first port for discharging gas when a shock detecting sensor detects a shock more than a predetermined value; a L-shape air bag body which has a head supporting portion of a passenger and a chest supporting portion thereof, and which is unfolded and expanded by discharged gas; and a cylindrical holder which covers the inflator, is formed with a wall for receiving discharged gas which is opposed to the first port of the inflator, and has a second port for discharging received gas to a vicinity of a bottom of the chest supporting portion of the air bag body.

With this configuration, when the inflator is ignited and high temperature gas is discharged through the first port, gas collides against the wall of the holder formed in a position opposed to the first port so that the wall absorbs heat from the gas and the gas is cooled. The gas is further cooled while passing through between the inflator and the holder, and the gas is lowered at temperature and is discharged toward the air bag body through the second port of the holder. Therefore, it is unnecessary to take measures to cope with high temperature gas charged into the bag body, or simple measures suffice to cope with high temperature gas and thus, the cost price can be lowered.

Further, since gas is discharged toward the vicinity of the bottom of the chest supporting portion in the air bag body, the bag body expands while avoiding the wearing track of a seat belt and therefore, the bag body does not prevent wearing movement of the seat belt.

Furthermore, since gas smoothly flows from the chest supporting portion of the bag body to the head supporting portion, a member for guiding gas to the head supporting portion is unnecessary and thus, the cost price is lowered correspondingly.

In a preferable embodiment, the inflator has an upper portion and a lower portion, the inflator is provided with the first port in the upper portion thereof, and the holder is provided with the second port in a position corresponding to the lower portion of the inflator.

With this configuration, since the first port of the inflator is provided in the upper portion of the inflator, gas contacts with the holder and is cooled while flowing between the first port of the inflator and the second port of the holder, and the temperature of the gas is lowered. Therefore, it is unnecessary to take measures to cope with the air bag body at high temperature, or it is possible to take a simple measures suffice to cope with the bag body at high temperature and thus, the cost price can be lowered.

Further, since the flow direction of gas from the first port to the second port is downward, it is easy to charge gas to the chest supporting portion of the bag body as it is.

In a preferable embodiment, discharged gas through the second port flows while curving into a substantially L-shape from the vicinity of the bottom of the chest supporting portion toward the head supporting portion.

With this configuration, since gas reaching the air bag body through the first port of the inflator and the second port of the holder can flow while curving into a substantially L-shape from the vicinity of the bottom of the chest supporting portion toward the head supporting portion, the track of the seat belt, especially of the shoulder belt is not hindered consequently and the shoulder belt should not be separated from the upper part of the passenger's body.

In another preferable embodiment, the inflator is supported substantially vertically by a seat back, the inflator has a gas generating chamber and a cooling chamber disposed above the gas generating chamber, and the first port is formed in the cooling chamber.

With this configuration, since the inflator is supported substantially vertically by the seat back along the seat back, a volume of a side portion of the seat back is not occupied so much, and the difficulty of mounting the inflator to the seat back is lowered. Further, utilizing the fact that the inflator is cylindrical in shape as a measure for lowering the temperature of discharged gas, gas can be cooled appropriately even if a special cooling means is not provided, the cost price is not increased.

In a preferable embodiment, the chest supporting portion of the bag body is expanded and developed while being guided by a vehicle member.

With this configuration, gas discharged by the inflator is discharged in a slightly downward rather than a horizontal direction. Therefore, the gas pressure is sufficiently applied to the chest supporting portion of the bag body, and a set shape can be ensured. Since the chest supporting portion is guided by the vehicle member, gas reaches the head supporting portion within an appropriate time so that the head supporting portion can be expanded and developed. Further, the head supporting portion is not easily deviated in longitudinal direction.

In a preferable embodiment, the holder has at the second port a guide portion opposed to the first port of the inflator.

With this configuration, gas discharged through the first port of the inflator is smoothly discharged through the second port by the guide portion of the holder.

From a second aspect of the present invention, there is provided an air bag apparatus, in which an inflator has a first port for discharging gas; an air bag body is unfolded and expanded by discharged gas; and a cooling member is opposed to the first port of the inflator for cooling discharged gas, and cooling member has a second port for discharging cooled gas to the air bag body.

Preferably, the inflator has an upper portion and a lower portion, the inflator is provided with the first port in the upper portion thereof, and the cooling member is provided with the second port in a position corresponding to the lower portion of the inflator.

Preferably, the air bag body has a head supporting portion and a chest supporting portion, the chest supporting portion has a bottom and an upper portion thereof, the air bag body has a partition between the head supporting portion and the chest supporting portion. Cooled gas is discharged into the vicinity of the bottom of the chest supporting portion, and discharged gas is guided toward the upper portion of the chest supporting portion by the partition.

Preferably, the partition has a hole therethrough at the upper portion of the chest supporting portion, and the head supporting portion communicates with the chest supporting portion through the hole of the partition.

Preferably, the inflator is supported by and disposed along the seat back.

Preferably, the inflator has an upper portion and a lower portion, the inflator is provided in the lower portion thereof with a gas generating chamber for generating gas, and in the upper portion thereof with a cooling chamber for cooling generated gas, the cooling chamber communicates with the gas generating chamber, and the cooling chamber is provided with the first port.

Preferably, the chest supporting portion of the bag body is guided by a vehicle member to be expand and be developed.

Preferably, the cooling member has at the second port a guide portion extending toward the first port.

From a third aspect of the present invention, there is provided an inflator apparatus for unfolding and expanding an air bag, in which an inflator body has a first port for discharging gas; and a cooling member is opposed to the first port of the inflator body, the cooling member is one for cooling discharged gas.

Preferably, the inflator body has an upper portion and a lower portion, the inflator body has a first port in the upper portion thereof, and the cooling member is provided in a position corresponding to the lower portion of the inflator body with a second port for discharging cooled gas.

BRIEF DESCRIPTION OF THE DRAWINGS

FIG. 2 is a side view of an air bag body shown in FIG. 1;

FIG. 3 is a perspective view showing a structure of a partition;

DETAILED DESCRIPTION OF THE PREFERRED EMBODIMENTS

Figure 1:
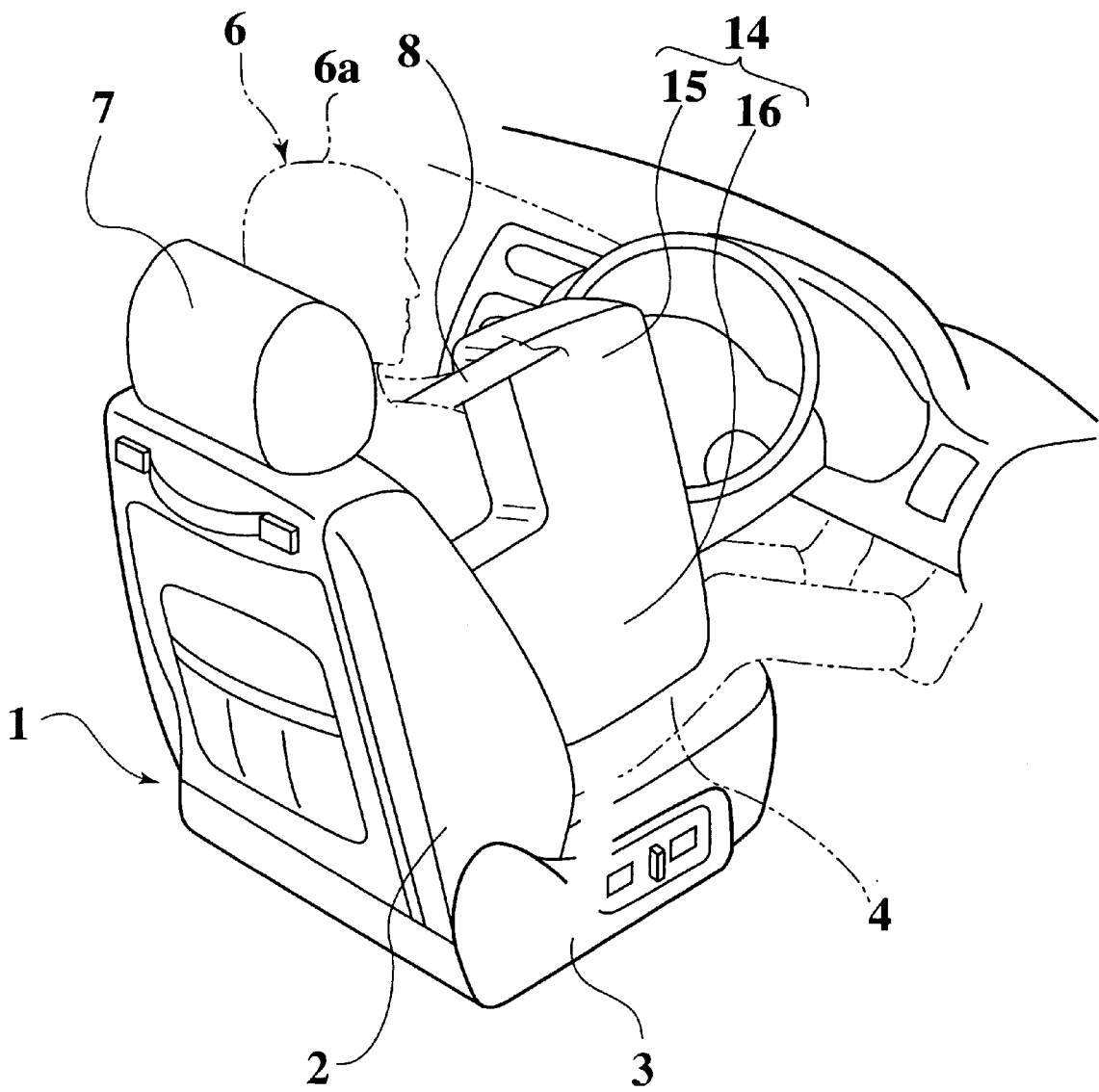
FIG. 1 is a perspective view of the entire seat to which an air bag apparatus of a first embodiment of the present invention is mounted.

As shown in FIG. 1, a seat 1 comprises a seat back 2 and a seat cushion 3, and an air bag apparatus 4 is arranged on a side of the seat back 2 opposed to a side wall in a passenger's compartment which is not shown.

An arm rest 5 as a known "vehicle member" shown in FIG. 2 is projected toward the seat back 2 from the side wall in the passenger room for supporting the arm (not shown) of a passenger 6. The reference number 7 represents a head rest, the reference number 8 represents a seat belt, especially a shoulder belt.

As shown in FIG. 2, the air bag apparatus 4 comprises at least an inflator 10 as an inflator body provided with first port 11 and capable of igniting and discharging a body of inert gas G when a shock detecting sensor (not shown) detects a shock equal to or greater than a predetermined value, a cylindrical holder 12 as a cooling member which covers the inflator 10 and which is provided with a second port 13 for discharging gas G, and a bag-like bag body 14 accommodating the inflator 10 and the cylindrical holder 12 therein.

As shown in FIG. 2, the bag body 14 includes a head supporting portion 15 capable of supporting a head 6a of the passenger 6, and a chest supporting portion 16 capable of supporting a chest (not shown) of the passenger 6. The bag body 14 is formed into a substantially L-shape by the head supporting portion 15 and the chest supporting portion 16. The bag body 14 is normally folded, and is expanded by gas G discharged by the inflator 10. The chest supporting portion 16 can expand and develop while being guided by the arm rest 5 which is the vehicle member.

A partition 18 is made of cloth for example and is provided between the head supporting portion 15 and the chest supporting portion 16. The partition 18 restricts the flow of gas G. More specifically, the partition 18 is arranged by sewing its end to opposite sides of a base cloth of the bag body 14 with the partition 18 inclined at an angle of 45 degrees with respect to the horizontal, so that the partition 18 guides the gas G from the inflator 10 toward the head supporting portion 15 with respect to the discharged direction of the gas G.

The head supporting portion 15 and the chest supporting portion 16 of the bag body 14 are formed into two bags by the partition 18. As shown in FIG. 3, through holes 18a communicating both the bags with each other are formed only in an upper portion of the partition 18, i.e., formed only at the side of the wearing track space 9 of the seat belt, or formed at the upper portion of the chest supporting portion. The head supporting portion 15 communicates with the chest supporting portion 16 through the through holes 18a.

As shown in FIG. 2, the inflator 10 is disposed substantially vertically, and is supported by and along the seat back 2 through the holder 12. The inflator 10 is cylindrical in shape for example, and is provided at its one side with a lower layer (lower portion) gas generating chamber 20, and at its other side with an upper layer (upper portion) cooling chamber 21 which is in communication with the gas generating chamber 20. The gas generating chamber 20 accommodates an igniting device and a gas generating device of the inert gas G (both not shown), and the igniting device is connected to a shock sensor (not shown).

Figure 4:
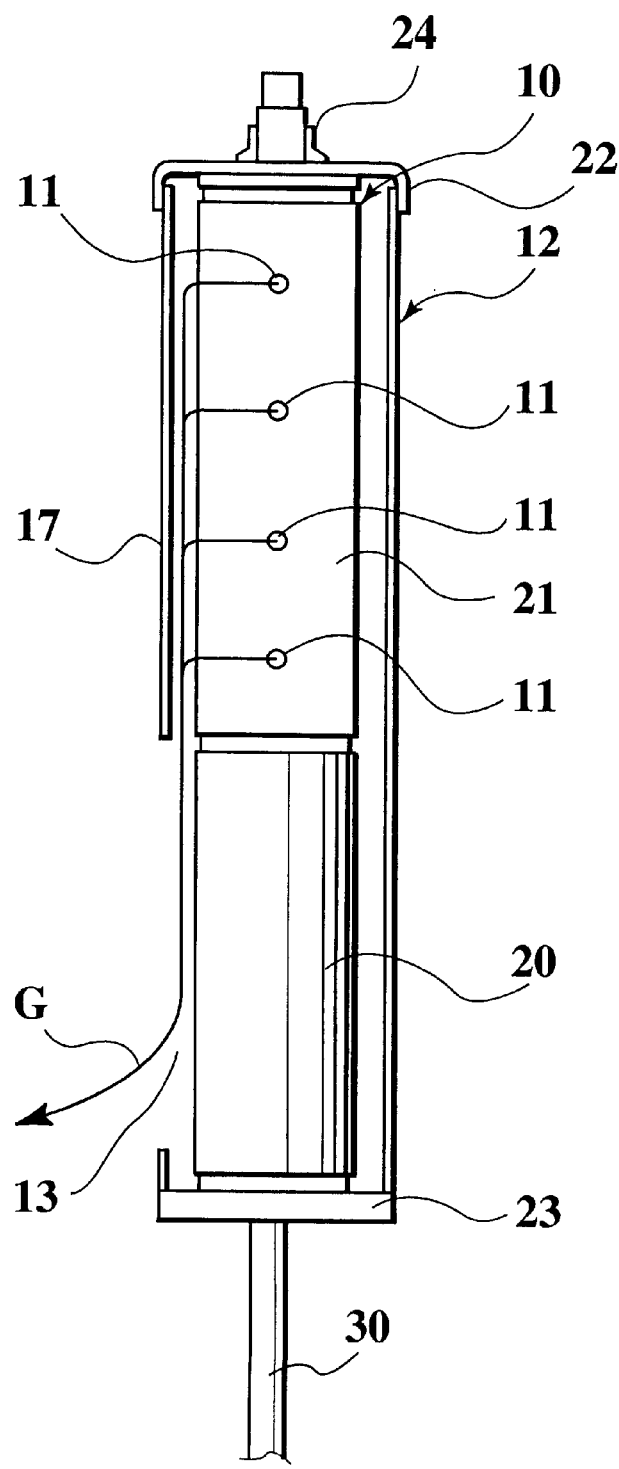
FIG. 4 is an enlarged sectional view of an inflator and a holder.
Figure 5:
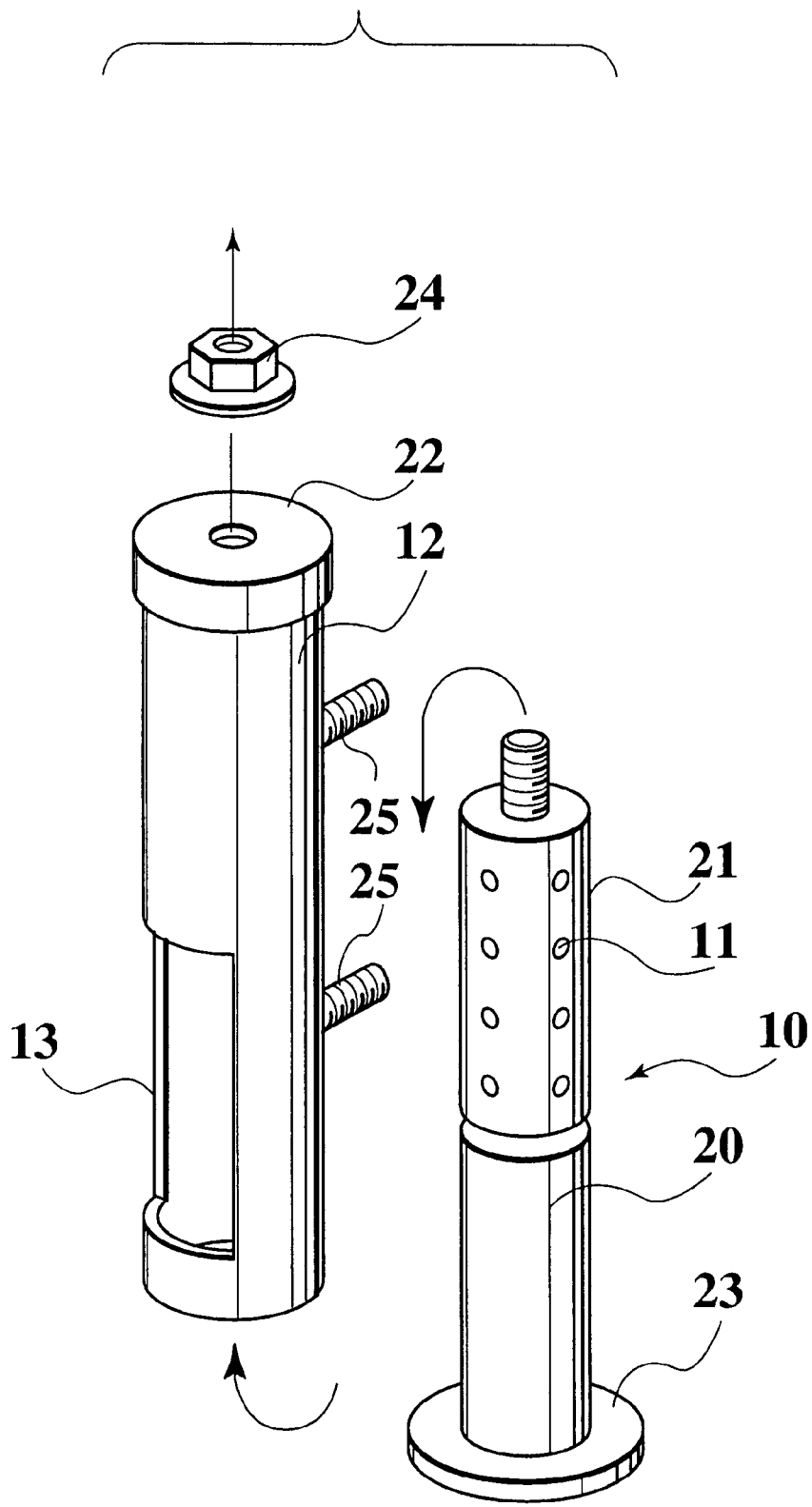
FIG. 5 is an exploded view of the inflator and the holder.

As shown in FIGS. 4 and 5, the holder 12 is made of metal for example, and is fixed to a frame (not shown) of the seat back 2 by bolts 25 (see FIG. 5) projected from the holder 12. A cylindrical wall 17 is formed on a portion of the holder 12 opposed to the first ports 11 of the inflator 10 to receive the G discharged through the first ports 11. The second port 13 is formed in the lower portion of the holder 12, i.e., in a portion of the holder corresponding to the lower portion of the inflator.

The inflator 10 and the holder 12 are held such that the inflator 10 is inserted into the holder 12 from the below, and a cap 22 covering the upper end of the inflator 10 is held by a nut 24. A flange 23 formed on the inflator 10 holds a lower end of the holder 12. The flange 23 is provided at its lower surface with a harness 30 for sending a signal to the gas generating chamber 20 and for igniting.

As shown in FIG. 2, the gas G flows through the second port 13 of the holder 12 from the first ports 11 of the inflator 10 and reaches the bag body 14, and is discharged toward the vicinity (toward the arm rest 5) of the bottom 16a in the chest supporting portion 16 of the bag body 14.

The gas G can flow such as to draw a substantially L-shaped curve line from the vicinity of the bottom 16a of the chest supporting portion 16 toward the head supporting portion 15. That is, the gas G discharged to the vicinity of the bottom 16a abuts against the partition wall 18 to change its flowing direction, and flows toward the upper portion of the chest supporting portion 16 and enters in the head supporting portion 15 through the through holes 18a.

Next, the operation of the air bag apparatus will be explained.

When the inflator 10 is ignited by the signal from the shock detecting sensor and the inert gas G is discharged through the first ports 11, the gas G collides against the wall 17 of the holder 12, and moves toward the second port 13 between the inflator 10 and the cooling chamber 21.

During this movement, the gas G contacts with the normal temperature wall 17, the heat of gas G is taken by the wall 17 and the gas G is cooled. As shown in FIG. 2, when the cooled gas G is discharged as shown by arrows, since the second port 13 is arranged such as to direct in a front direction FR, the bag body 14 of the air bag apparatus 4 which is normally folded, especially the chest supporting portion 16 is swiftly expanded toward the front direction FR of the automobile by the gas G discharged by the inflator 10.

Further, since the first ports 11 of the inflator 10 are formed in the upper portion of the inflator 10, a distance from the first port 11 to the second port 13 of the holder 12 formed in the position corresponding to the lower portion of the inflator 10 can be elongated. That is, the temperature of gas G can be sufficiently lowered, and it is unnecessary to take measures to cope with the bag body 14 at a high temperature, or it is possible to take simpler simple measures suffice to cope with the bag body 14 at a high temperature, and therefore, the cost price can be lowered.

Further, since the gas G flows downwardly from the first ports 11 to the second port 13, it is easy to charge gas to the chest supporting portion 16 of the bag body 14.

That is, the chest supporting portion 16 of the bag body 14 which is normally folded is first expanded and then, the gas G can be introduced toward the head supporting portion 15 through the through holes 18a of the partition 18. Therefore, the head supporting portion 15 and the chest supporting portion 16 reliably enter between the chest and the head 6a of the passenger 6 at the time of side-on crash, and the secondary collision energy of the passenger 6 toward the side wall in the passenger room can sufficiently be absorbed.

Furthermore, the gas G is discharged toward the vicinity of the bottom 16a of the chest supporting portion 16 of the bag body 14 and then, flows such as to draw the substantially L-shaped curve line toward the head supporting portion 15. Consequently, the bag body 14 expands while avoiding a space 9 of wearing track of the seat belt 8, especially the shoulder belt. Therefore, since the bag body 14 does not hinder the wearing of the seat belt 8, the shoulder belt 8 should not be moved away from the upper part of the body of the passenger 6.

The bag body 14 is formed into the two bags composed of the head supporting portion 15 and the chest supporting portion 16. The through holes 18a through the partition 18 between both the bags are formed at the side of the space 9 of the wearing track of the seat belt 8 shown in FIG. 2. The gas G discharged by the inflator 10 flows slightly downwardly with respect to the horizontal. First, the gas G is sufficiently introduced toward the bottom 16a of the chest supporting portion 16. The chest supporting portion 16 is expanded within a short time, the set shape of the chest supporting portion 16 can be ensured and is guided by the arm rest 5 as a vehicle member. Therefore, a body of gas G reaches the head supporting portion 15 within the appropriate time so that the head supporting portion 15 can be expanded and developed. A top 15a of the head supporting portion 15 is not easily deviated to longitudinal positions.

After the chest supporting portion 16 is expanded, the gas G passes through the through holes 18a and is guided into the head supporting portion 15. Therefore, a member for guiding the gas G to the head supporting portion 15 is unnecessary, and the cost price is reduced correspondingly.

Since the inflator 10 is substantially vertically supported by and along the seat back 2, the volume of the side of the seat back is not occupied so much, and it is easier to be mounted into the seat back 2. Further, utilizing the fact that the inflator 10 is cylindrical in shape as measures for lowering the temperature of discharged gas G, the gas G can be cooled appropriately even if a special cooling means is not provided, or gas can be cooled with a simple means and therefore, the cost price can be reduced.

Figure 6:
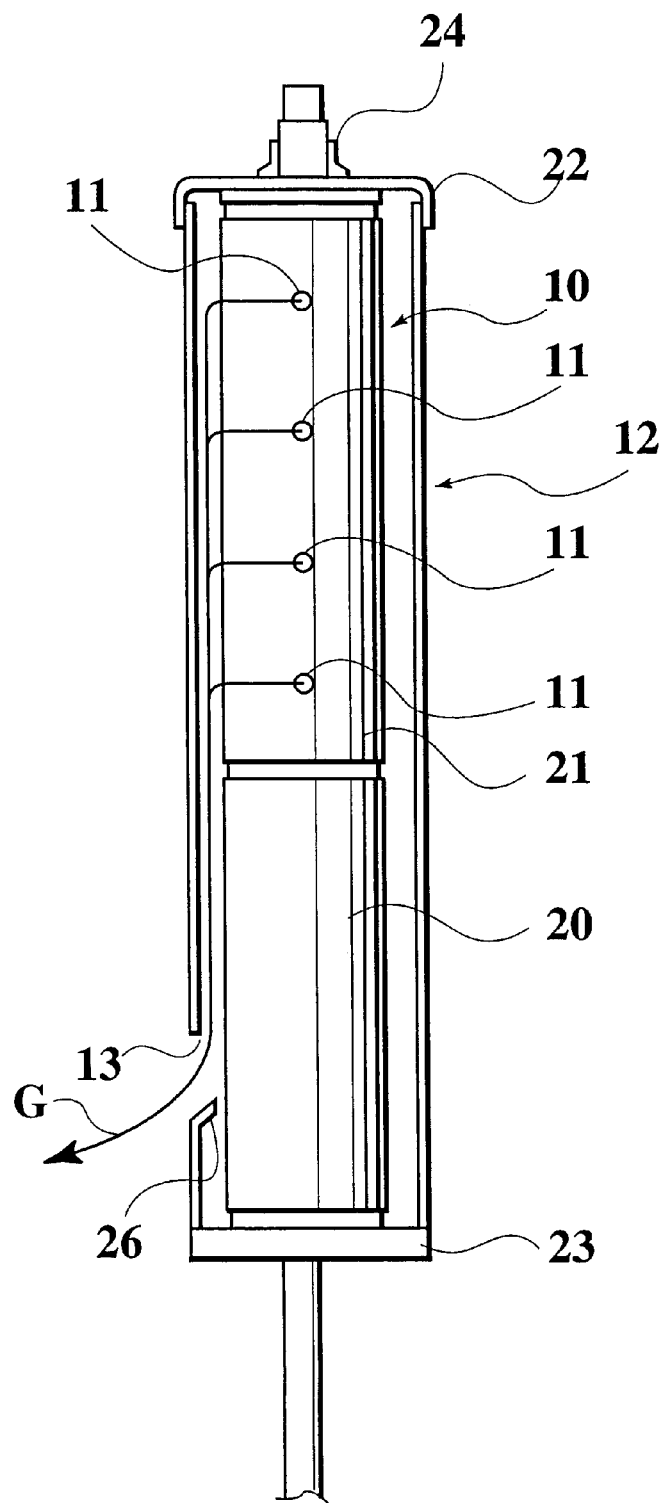
FIG. 6 is an enlarged sectional view of an inflator and a holder of an air bag apparatus according to another embodiment of the present invention.

FIG. 6 shows another embodiment of the present invention. The holder 12 is provided at its bottom of the second port 13 with a guide portion 26 opposed to the first ports 11 of the inflator 10. The guide portion 26 extends from a lower edge of the second port 13 to an inner side of the holder 12 diagonally upward, i.e., toward the first ports 11. If the gas G collides against the guide portion 26 provided in the bottom of the second port 13, the gas G discharged through the first port 11 of the inflator 10 is smoothly guided to the second port 13 by the guide portion 26 and is discharged.

Rather than a flat plate shape as shown in FIG. 6, the guide portion 26 may also be two dimensional curved surface in which slopes are continuously inclined in one direction, or three dimensional curved surface in which the slopes are curved in another direction also.

Figure 7:
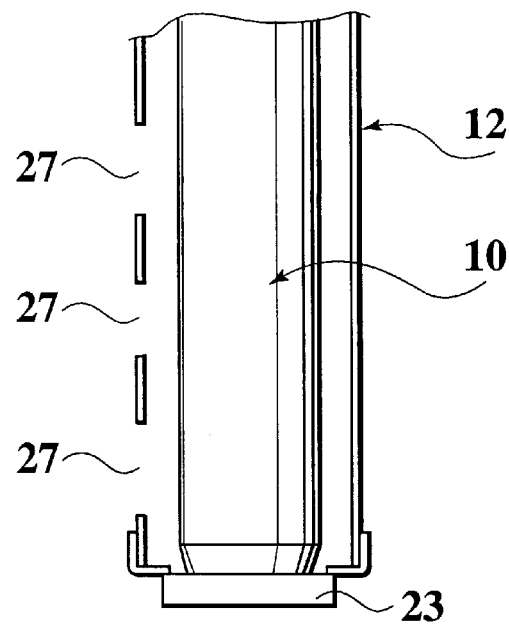
FIG. 7 is an enlarged sectional view of an inflator and a holder of an air bag apparatus according to further another embodiment of the present invention.
Figure 8:
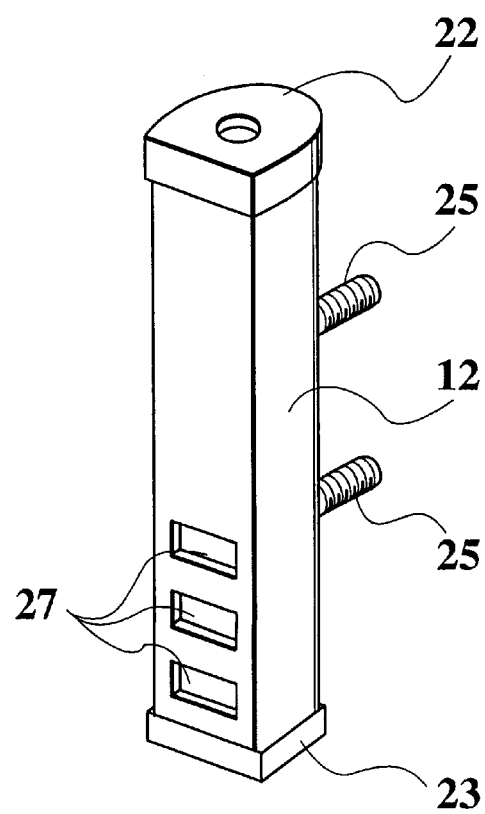
FIG. 8 is a perspective view of FIG. 7.

FIGS. 7 and 8 shows further another embodiment of the present invention. This embodiment is an example in which a plurality of second ports 27 of the holder 12 are provided instead of the single second port shown in FIG. 5. With such an embodiment also, the same effect as that described above can be obtained. Further, if the gas G is discharged through the plurality of second ports 27, a low pressure portion is formed between each of adjacent flows of gas G. The plurality of flows of gas G are drawn close to each other, and are prevented from dispersing. Therefore, the flows of gas G is concentrated toward the bottom of the chest supporting portion 16, and the development of the air bag body 14 does not hinder the wearing of the seat belt more effectively.

What is claimed is:

1. An air bag apparatus comprising:
    an inflator having a proximal end and a distal end, said inflator having a gas generating chamber at said proximal end and a first port at said distal end for discharging gas when a shock detecting sensor detects a shock more than a predetermined value;
    an L-shaped air bag body having a head supporting portion of a passenger and a chest supporting portion thereof, said air bag body operative for being unfolded and expanded by said gas;
    a tubular holder covering said inflator, said holder having a wall part totally enclosing more than half of said inflator from said distal end for guiding gas discharged through said first port toward said proximal end, said holder having a discharging part defining a second port at said proximal end for discharging guided gas to a vicinity of a bottom of said chest supporting portion of said air bag body; and
    said holder having a guide portion which is disposed at said second port and opposed to said first port of said inflator.

2. An air bag apparatus comprising:
    an inflator having a proximal end and a distal end, said inflator having a gas generating chamber at said proximal end, said inflator having a first port at said distal end for discharging gas;
    an air bag body operative for being unfolded and expanded by discharged gas;
    a holder opposed to said inflator, said holder having a wall part totally enclosing more than half of said inflator from said distal end for guiding gas discharged through said first port to be cooled from said first port toward said proximal end, said holder having a discharging part defining a second port at said proximal end for discharging guided gas to said air bag body;
    said air bag body comprising:
        a chest supporting-portion having a bottom corresponding to said proximal end of said inflator;
        a head supporting portion adjacent to said chest supporting portion; and
        a partition between said head supporting portion and said chest supporting portion, said partition having a distal end corresponding to said inflator, said partition defining a through-hole at only said distal end thereof for said head supporting portion and said chest supporting portion to communicate with each other there through; and
        said second port being directed toward said partition when developing and expanding said inflator body.

3. An air bag apparatus comprising:
    an inflator having a proximal end and a distal end, said inflator having a gas generating chamber at said proximal end, said inflator having a first port at said distal end for discharging gas;
    an air bag body operative for being unfolded and expanded by discharged gas; and
    a holder opposed to said inflator, said holder having a wall part totally enclosing more than half of said inflator from said distal end for guiding gas discharged through said first port to be cooled from said first port toward said proximal end, said holder having a discharging part defining a second port at said proximal end for discharging guided gas to said air bag body; and
    said inflator having a cooling chamber at said distal end thereof.

* * * * *